July 12, 1938.   L. LEITZ ET AL   2,123,510
ENLARGING APPARATUS
Filed Dec. 9, 1936   2 Sheets-Sheet 2
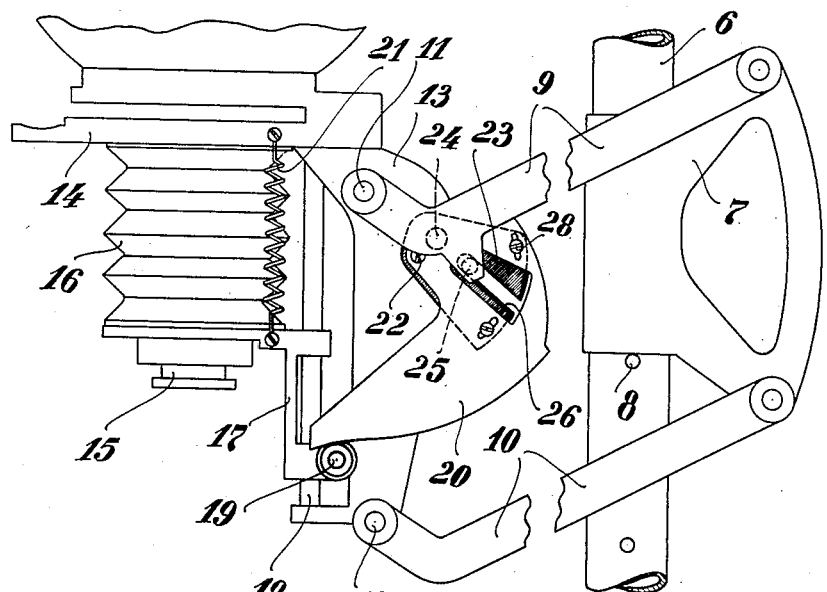
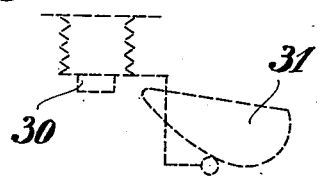
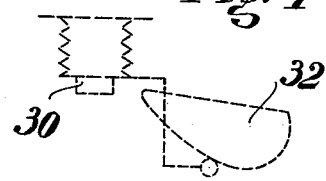
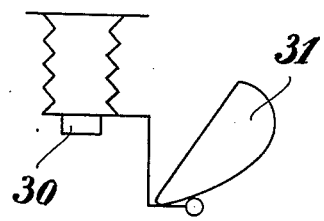
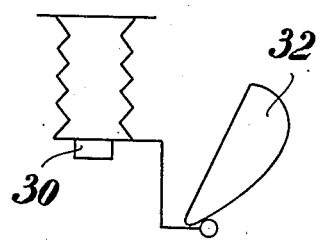
Ludwig Leitz
Christian Luz
INVENTORS Patented July 12, 1938

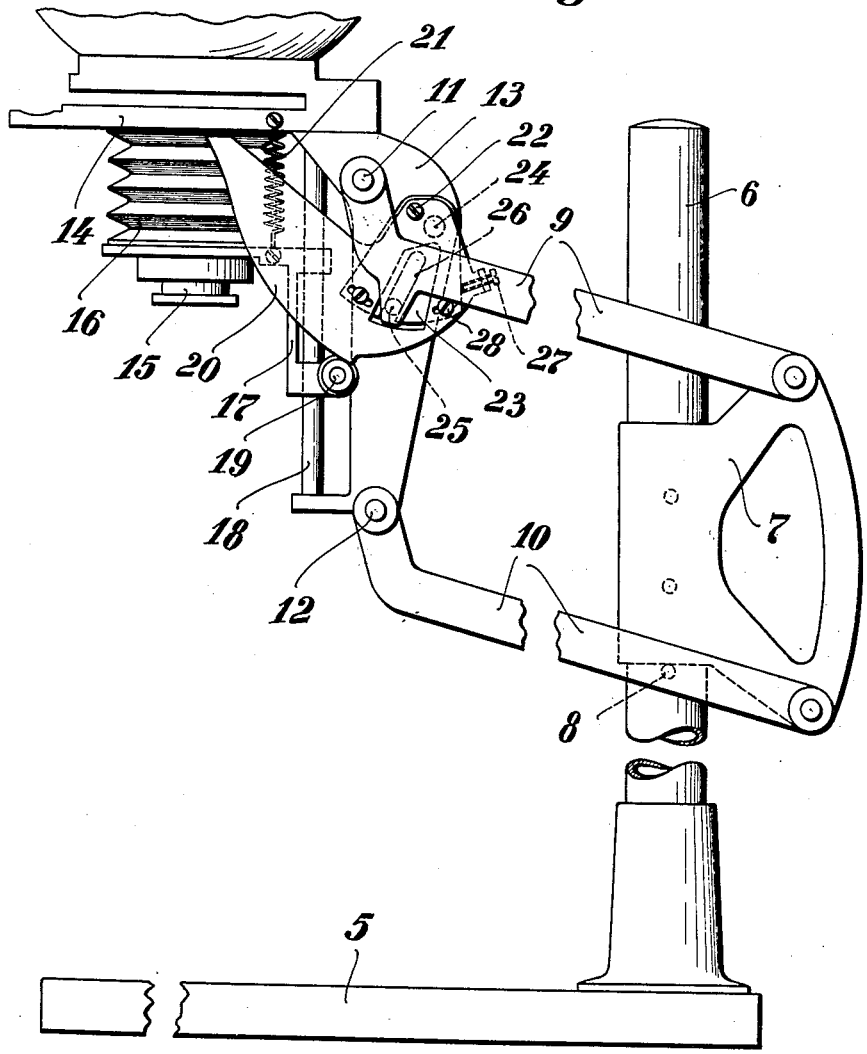

2,123,510

UNITED STATES PATENT OFFICE 2,123,510

ENLARGING APPARATUS

Ludwig Leitz and Christian Luz, Wetzlar, Germany, assignors to Ernst Leitz, G. m. b. H., Wetzlar, Germany Application December 9, 1936, Serial No. 114,939
In Germany January 13, 1936

3 Claims. (Cl. 88—24)

This invention relates to improvements in photographic enlarging apparatus of the type which includes automatic focus of the objective by means of a pivoted focusing cam. More particularly this invention relates to a photographic enlarger of the type in which the negative carrier and the objective are adjusted as a unit with relation to a measuring base or table, the adjustment being accomplished preferably by a system of swinging levers forming a parallelogram. In order to focus the objective automatically when the unit is adjusted, the structure includes a focusing cam which is pivoted to one of the said swinging levers and acts upon a roller connected to the objective so that the latter is focused by the cam when the swinging lever is operated. With such a construction it is obvious that the focusing range of the objective is limited by the limited range of movement which the swinging lever as a prime mover may impart to the focusing cam.

When it is desired to enlarge negatives of certain large sizes it is of particular importance to be able to adjust the objective automatically from a great enlargement to a very small enlargement. Prior disclosures of the type described above which depend solely upon the operation of the focusing cam caused by the movement of the swinging lever are incapable of producing such desired greater range of focus for the reason that the cam cannot be designed to accomplish this object without incurring practical obstacles which hinder the free movement of the cam.

The object of this invention is to provide a photographic enlarger including means for imparting to the focusing cam a greater range of movement than is possible with prior disclosures. The invention is embodied in a structure in which the focusing cam is pivoted to an intermediate member which imparts an additional movement of the cam to increase the focusing range. Accordingly the invention is embodied in a photographic enlarging apparatus arranged and constructed as hereinafter set forth and as illustrated in the accompanying drawings in which Fig. 1 is a side view of the apparatus with parts broken away and showing the enlarger in a position when a great enlargement is to be made.

Fig. 2 is a similar view showing the parts in a position for making a very small enlargement and with details omitted.

Figs. 3 and 4 are diagrammatic views illustrating the different focusing ranges obtainable with prior disclosures and with the present invention.

These views are pure diagrams with the parts indicated by lines only.

Referring to Figure 1 the reference numeral 5 denotes a base which also serves as a measuring table in the usual manner. The base supports a column 6 which carries a bracket 7 adapted to be adjusted vertically by means as at 8. The bracket carries two pivoted levers 9 and 10 which form a parallelogram, the other ends of the levers being pivoted respectively at 11 and 12 to a bracket 13 which supports the negative carrier 14 with the objective 15.

The objective is provided with the usual bellows 16 and is connected to a bracket 17 which slides upon a vertical guide post 18. The objective bracket carries a roller 19 which is held against the focusing cam 20 by a spring 21. The cam is pivoted at 22 to a segment or plate 23. The latter in turn is pivoted at 24 to the bracket 13. The segment is operated by a roll 25 carried by the lever 9 which engages a slot 26 in the segment. The focusing cam 20 may be adjusted with respect to the plate 23 by an adjusting screw 27, the two parts being locked together by screws 28 in an obvious manner.

Figure 1 shows the enlarger adjusted for making a great enlargement. In order to reach this position the enlarger has been lifted upwards away from the base 5. This lifting movement is very small because the effective lifting leverage 24—25 is at its greatest length. When smaller enlargements are to be made and the enlarger is lowered, the driving roll 25 acts upon the segmented plate 23 and the focusing cam 20 with increasing angular speed until the pivots 11, 24 and 25 lie in a single straight line and whereby the maximum range of adjustment is obtained. A position of dead centers within the slot 26 cannot occur because the power applied to the roll 25 acts only against the one edge of the slot 26.

The dimensions of the segmental plate 23 and the cam 20 are in direct proportions to the angular speed of the cam and at the same time, the curving of the cam is decreased and an emphatic S-curve, which otherwise would result, is avoided.

It will further be noted as a feature of the invention that the angular movement of the focusing cam, when greater enlargements are to be made, is less than when smaller enlargements are made. This is of course in accordance with the optical laws governing photographic enlargers. But this feature or advantage is possible only with the disclosure herein presented. It will also be noted that the individual turning movement of the focusing cam 20 in passing from the one position to the other is increasing in speed in proportion to or in accordance with the change in the relative vertical positions of the cam. Or in other words, the greater the range or extent of movement with relation to the base table 5, the greater the speed of the turning movement of the cam to effect the corresponding automatic focus.

Figure 3 is a diagrammatic view which illustrates the extreme upper and lower positions of the objective 30 and the focusing cam 31 in prior disclosures of the type referred to hereinabove. Figure 4 is a similar diagram showing the objective 30 focused by a focusing cam 32 operated in accordance with the invention. It will be seen that the focusing range is greater in Figure 4 than in Figure 3 due to the increase in speed of the cam apart from the adjusting movement.

We claim:—

1. A photographic enlarging apparatus including an objective and a base, a bracket for supporting the objective, a lever for moving the bracket to adjust the position of the objective relative to the base for enlarging purposes, a focusing cam operatively connected to the objective, a member interposed between the focusing cam and the bracket, means for pivoting said member to the bracket, means for pivoting the focusing cam to the said member in eccentric adjustable fixed relation to the said first pivot and means on the said lever in constant operative engagement with the said interposed member for moving the same together with the focusing cam around said first named pivot to automatically focus the objective with relation to the adjusted position thereof.

2. A photographic enlarging apparatus including an objective and a base, a bracket for supporting the objective, a lever for moving the bracket to adjust the position of the objective relative to the base for enlarging purposes, a focusing cam operatively connected to the objective, a member interposed between the focusing cam and the bracket, means for pivoting said member to the bracket, means for pivoting the focusing cam to the said member in eccentric relation to the said first pivot, a roll carried by said lever in constant movable engagement with a slot in the said interposed member for moving the latter around said first named pivot together with the focusing cam to automatically focus the object with relation to the adjusted position thereof.

3. A photographic enlarging apparatus including an objective and a base, a bracket for supporting the objective, a lever for moving the bracket to adjust the position of the objective, a support secured to the latter, a cam roll on said support, a focusing cam, a spring for keeping the said roll in operative contact with the focusing cam, a plate interposed between the focusing cam and the said bracket, means for pivoting said plate to the bracket at a given point, means for pivoting the focusing cam upon said plate in eccentric relation to the said first named pivot and means on the said lever in operative engagement with the said interposed plate for moving the latter and the focusing cam around said first named pivot to operate the focusing cam to automatically focus the objective with relation to its adjusted position and means for adjusting the relative positions of the said plate and the focusing cam.

LUDWIG LEITZ.
CHRISTIAN LUZ.